United States Patent [19]

Tesch

[11] Patent Number: 5,604,025

[45] Date of Patent: Feb. 18, 1997

[54] FLOOR COVERING BASED UPON THERMOPLASTIC SYNTHETIC MATERIAL

[76] Inventor: Gunter Tesch, Ave. Jean-Marie Musy 15, CH-1700 Fribourg, Switzerland

[21] Appl. No.: 182,167

[22] PCT Filed: May 25, 1993

[86] PCT No.: PCT/EP93/01317

§ 371 Date: Jan. 25, 1994

§ 102(e) Date: Jan. 25, 1994

[87] PCT Pub. No.: WO93/24296

PCT Pub. Date: Dec. 9, 1993

[30] Foreign Application Priority Data

May 26, 1992 [DE] Germany ............... 42 17 438.4
Oct. 21, 1992 [DE] Germany ............... 42 35 530.3

[51] Int. Cl.⁶ ............... B32B 15/00; B32B 27/36
[52] U.S. Cl. ............... 442/394
[58] Field of Search ............... 264/22, 37, 76, 264/70, 75, 112, 77, 126; 428/257, 67, 149, 172, 325, 331, 213, 284, 285, 286, 287, 315

[56] References Cited

U.S. PATENT DOCUMENTS

| | | | |
|---|---|---|---|
| 2,962,081 | 11/1960 | Dobry et al. | 154/20 |
| 3,385,722 | 5/1968 | Weaver et al. | 117/21 |
| 4,205,110 | 5/1980 | Jean | 428/213 |
| 4,396,566 | 8/1983 | Brinkman et al. | 264/70 |
| 4,584,209 | 4/1986 | Harrison | 427/201 |
| 5,244,942 | 9/1993 | Hover et al. | 523/171 |

FOREIGN PATENT DOCUMENTS

| | | |
|---|---|---|
| 0226946 | 7/1987 | European Pat. Off. . |
| 0321760 | 6/1989 | European Pat. Off. . |
| 1167760 | 11/1958 | France . |
| 3507655 | 9/1986 | Germany . |
| 857254 | 12/1960 | United Kingdom . |
| 2049540 | 12/1980 | United Kingdom . |

Primary Examiner—Thurman K. Page
Assistant Examiner—Kathryne E. Shelborne
Attorney, Agent, or Firm—Bacon & Thomas

[57] ABSTRACT

Described is a floor covering consisting of several layers of foil pieces (6,7) consisting of thermoplastic synthetic material compressed by the action of pressure and temperature and bonded together at least partially.

22 Claims, 1 Drawing Sheet

FLOOR COVERING BASED UPON THERMOPLASTIC SYNTHETIC MATERIAL

FIELD OF THE INVENTION

The invention concerns a floor covering including a thermoplastic synthetic material with a decorative, visible side. Thermoplastic floor covering is known, for example, from EP-PS 0321760.

BACKGROUND OF THE INVENTION

The described floor covering exhibits a homogeneous structure and relatively high resistance to wear. But such a floor covering is relatively costly, because the process for its manufacture is relatively expensive and the raw materials must first be submitted to a complicated procedure for the production of monochromatic granulates or chips. It is necessary in this case to adhere to a precise dosage of the binding agent and colorant additives. In a development of the manufacturing process it is also possible to combine chips of different colors, that is to say, monochromatic chips in a specific mixing ratio relative to the raw material, in which case the binding agent is applied and plasticized, still further binder components being optionally added, and then, after the addition of all necessary materials, the plasticized binding agent is kneaded into a monochromatic product for roll crushing and reduced in size to form monochromatic chips. Several charges of respectively monochromatic chips are then mixed together in a preset mixing ratio and processed into a floor covering. This manufacturing process consists of several steps and is energy-intensive. The several processing steps of the raw material, particularly the preparation of the product for roll crushing and the size reduction of the same into chips and subsequent melting of the chips to the point where they fuse together result several times in the destruction of the "energy content" of the material. The floor covering described must moreover have a homogeneous gap-free structure, which imposes further restrictions on the process of manufacture.

Known from EP 0479053 is another highly compressed covering material. The highly compacted material is produced by compressing pieces of plastic, in which case it is essential that the material be subjected to a continuous rise in pressure at an elevated temperature. Double flat presses are employed to produce the material described. Suitable as raw materials are pieces of plastic. The final product is supposed to exhibit a homogeneous structure. These demands upon the final material have the consequence that it is necessary to utilize high pressures and temperatures in the manufacturing process, which lie within the melting range of the plastics employed.

Known moreover from DE-PS 35 46 184 is another floor covering made of thermoplastic synthetic materials in which plate-shaped molded pieces made of thermoplastic synthetic materials, especially cuttings, pieces or chips are processed into a homogenous product without gaps. The process for the production of the structure disclosed is expensive like those described above. The shaped pieces must first be sintered at a temperature above approximately 130° C.; at the end of the sintering interval the temperature is increased to about 170° C. to heat the layer of shaped pieces uniformly and permit them to be pressed into a material with a homogeneous gap-free structure.

SUMMARY OF THE INVENTION

The problem addressed by the present invention is to make available a floor covering which, produced by a simple process of manufacture, will have advantageous properties in use. Specifically, the floor covering should be inexpensive and its decorative form should be easily adaptable to the needs at hand.

This problem is solved by the floor covering as claimed herein.

DESCRIPTION OF THE DRAWINGS

The invention shall be explained in detail with reference to the following drawings in which.

DETAILED DESCRIPTION

Figure 1:
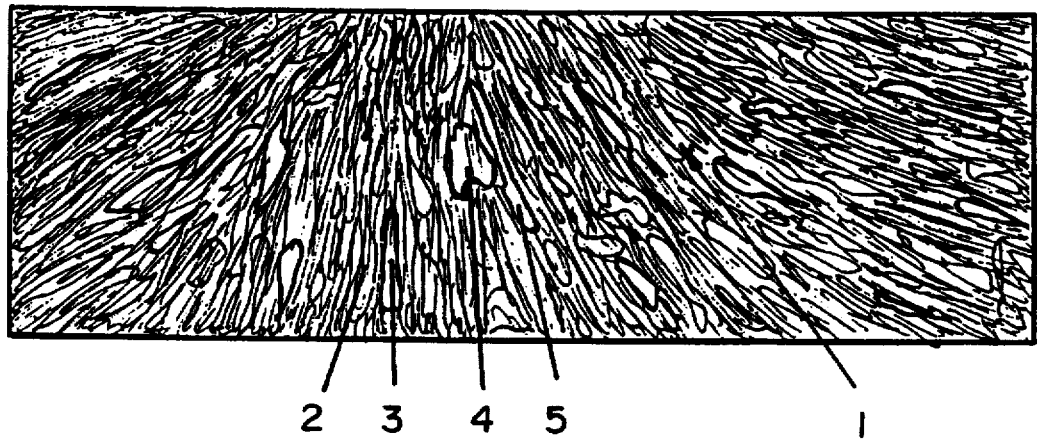
FIG. 1 is schematic view from the top of a floor covering per the invention.

The inventive floor covering consists of several layers of foil pieces made of thermoplastic synthetic materials compressed by the action of pressure and temperature and bonded together at least in part. It is advantageous if the foil pieces originate from scrap or remnants. Because scrap and remnant foils are particularly cheap as a material, the price of the covering produced from them is especially attractive. Moreover, plastic foil wastes, otherwise amenable only to expensive recycling processes, are eliminated by simple means via such use. Obviously it is also possible to utilize new foil for the manufacture of the covering, though a floor covering thus produced will be more expensive. For many applications it is appropriate for the uppermost, visible and pattern-forming layer to consist of pieces of new foils and the other layers of pieces of plastic foil scrap. A further advantage of the use of plastic foil scrap is that, because the material is inexpensive, it is also possible to produce thick plates, that is to say, tiles with a thickness of about 10 mm economically.

In an advantageous embodiment, the upper visible layer, that is to say, the side walked upon can be provided with a wear-resistant and non-skid surface foil layer. Preferred is a variant of the floor covering in which pieces of polyolefin foil are used. It is also possible to process foil pieces of different materials in a floor covering. It is nevertheless advantageous if, for example, 80–90% of the material consists of low-pressure polyethylene and the remainder of other thermoplastic synthetic materials. The polyolefin foil pieces, bonded together under the influence of pressure and temperature, produce a smooth surface on the floor covering, which does not have sufficient wear resistance and non-skid qualities. For that reason it is advantageous, if a foil layer is applied to the surface of the floor covering walked upon, which will give the covering wear resistance and non-skid qualities. The foil can be made of polyamide, polyester or preferably of an ionomeric copolymer of ethylene with acrylic acid. The bond between such a foil and the plastic foil material is so good that the foil cannot be distinguished as a separate layer, but forms a unit with the plastic foil material.

The invented floor covering exhibits essentially a structure in which the foil pieces or, respectively, flake-like foil pieces of which the floor covering consists are bonded together only to the extent that they exhibit permanent coherence. It is important that the inventive floor covering exhibit elastic and damping properties, in which case it is an advantage if there are small air bubbles or cavities between the foil pieces, preferably in the region distant from the surface, the damping properties of the floor covering being thus produced or improved. The surface of the inventive floor covering is homogenous and free of gaps. There will be no air bubbles in the case of a thin covering, such as, one produced from only a few foil layers. These coverings are thin and elastic, enabling them to be rolled up, but exhibit no significant damping properties or resilience to being stepped on. The thick-walled floor coverings have the additional advantage that they do not necessarily have to be welded when laid in order, for example, to produce a covering with a thickness of 3 mm from 60 layers of 50µ thick foils.

The pressure and temperature values necessary for the manufacture of the inventive floor covering are lower than the values of these operating parameters for the production of conventional floor coverings of this type. It is sufficient, if the temperature lies within the softening temperature range of the plastic employed. The energy expenditure necessary for the manufacture of the invented floor covering is thus generally lower. It is also possible to vary the compaction of the foil pieces by means of a different pressure value, which will impart different properties to the floor covering.

In one embodiment of the invention the foil pieces exhibit a flake-like or three-dimensional shape. The three-dimensional shape can be produced either by stretching, deep-drawing, the formation of dimples in flat foils or by the partial shrinkage of flat foil pieces. The utilization of three-dimensionally shaped or flake-like foil pieces results in a better effect where cavities are intentionally produced by varying compaction and point pressing than can be achieved with flat foils. The production of a stamped surface is also thereby simplified. There is in addition the advantage that foil scraps often have unequal thicknesses and shapes and are always available in a three-dimensional form, because they result from the cutting up of relatively large foil sheets or foil layers. The utilization of scrap foils for the manufacture of the invented floor covering makes it much cheaper than comparable floor coverings made of new material; and plastic foil scrap is a beneficial use of material otherwise subjected to costly recycling processes.

In another embodiment of the invention, the underside of the floor covering is equipped with a layer to ease the cementing down of the covering. This layer consists of polyolefin material and can, for example, be a fabric, a fleece or a material which is scattered on. The inventive floor covering exhibits comparatively good resilience and sound-deadening properties. Its cross-sectional structure can be an integral structure, that is to say, the region close to the surface region has greater compaction than the region distant from the surface. The above-discussed properties of the floor covering are thereby improved still further.

A particular advantage of the inventive floor covering is that its surface can be provided with a pattern in one or more colors. It is sufficient, if the foil layer forming the surface is given a certain pattern, that is to say, if this layer is formed by foils of a preset color composition and arrangement. Thus, dyeing or patterning process required for generic floor coverings which is usually carried out by the mixing in and melting on of other pieces having a different color is unnecessary. Surprisingly, the bonding of arbitrarily deposited foil pieces under the action of pressure and temperature also leads to a decorative but not repeatable patterning of the surface side of the floor covering, in which the colors of the individual foil pieces lie alongside one another, resulting in decoratively indistinct regions, even color transitions. If the surface patterning exhibits restricted individual structures, for example, dot-like patterning, it is possible to achieve such a structure by means of individual, colored foil flakes deposited on a monochromatic background. A repeatable patterning of the surface is possible by making intentional use of foil scraps sorted according to color or imprint.

The inventive floor covering can be produced by means of a calendering machine. Layers of thermoplastic synthetic foil pieces laid down to form a strip for example, polyolefin foils, are compressed and bonded together by the action of pressure and temperature at a temperature within the softening temperature range of the material employed, so that even the individual pieces of the plastic foil material are at least partially bonded together. The surface of the structure thus produced can then be provided with a wear-resistant and anti-skid foil layer. In the next step of the process, the layer of foil pieces is permanently bonded to the foil layer by the action of pressure and temperature. The process for the manufacture of the invented floor covering permits a rapid and simple changing of the output, for example, to different color patterns, different degrees of compression or different product dimensions/wall thicknesses. For example, a change in the color of the floor covering to be produced is achieved merely by the addition or use of foil flakes of a different color. This measure requires no change in the production process; different colored floor coverings can even be produced in alternation. As a development of the process, the wear-resistant foil layer can be applied to the already layered, but not yet compressed foil pieces. And then, in one operation, for example, by means of a calender roller, the foil piece layer is compressed, the foil pieces being bonded to one another and to the surface layer.

Figure 2:
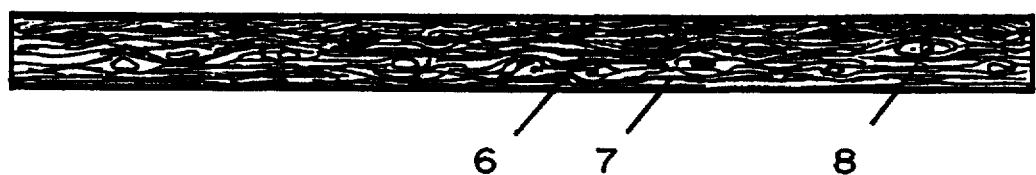
FIG. 2 is schematic view of a section through the floor covering of FIG. 1.

The surface of the visible, decorative side 1 of the invented floor covering is provided with a colored pattern. The individual color regions 2,3 lie alongside one another. The sharply delimited colored regions 4,5 are produced by the use of flat, thin foil flakes. The structure of the floor covering is, as seen in FIG. 2, formed by individual foil pieces 6,7. The cohesion of the foils is permanent, but the bond of the individual foils, particularly in the region distant from the surface, shows individual air bubbles 8 or, respectively, cavities.

I claim:

1. A floor covering including thermoplastic synthetic material with a decorative, visible side and an underside, said floor covering being formed from several layers of foil pieces (6, 7) made of thermoplastic synthetic material compressed and bonded together at least in part by pressure and temperature, and wherein at least a region near a surface is more highly compressed than a region distant from the surface.

2. A floor covering of claim 1 including thermoplastic synthetic material with a decorative, visible side and an underside, said floor covering having been formed from several layers of foil pieces (6, 7) made of thermoplastic synthetic material compressed and bonded together at least in part by pressure and temperature and wherein air bubbles are present between the compressed foil layers (6, 7) which have been bonded together.

3. The floor covering according to claim 1, wherein a surface of the visible side of the floor covering, which can be walked upon, is provided with a wear-resistant and non-skid foil layer.

4. The floor covering according to claim 1, wherein the pieces of plastic material (6,7) are pieces of polyolefin foils.

5. The floor covering according to claim 4, wherein the polyolefin foils include polyethylene foils.

6. The floor covering according to claim 1, wherein the underside is provided with a layer of polyolefin material.

7. The floor covering of claim 1, wherein said floor covering has a thickness between 1 mm and 10 mm.

8. The floor covering of claim 1, wherein said floor covering has a thickness between 3 mm and 6 mm.

9. The floor covering of claim 1, wherein the decorative, visible side of the covering is multicolored.

10. The floor covering of claim 1, wherein the decorative, visible side of the covering is patterned.

11. The floor covering of claim 1, wherein the decorative, visible side of the covering is monochromatic.

12. The floor covering of claim 1, wherein a color patterning results from a preselected application of foil pieces (6,7).

13. The floor covering of claim 1, wherein the visible side of the floor covering is provided with a stamped structure.

14. A process for the production of a floor covering according to claim 1, comprising the steps of: depositing a plurality of layers of thermoplastic synthetic foil material in pieces (6,7) to form a strip; compressing by pressure at a temperature within the softening temperature range of the foil material; and at least partially bonding the pieces of foil material (6,7) to one another.

15. The process according to claim 14, wherein prior to said step of compressing, a wear-resistant and non-skid foil is laid on said strip of foil material pieces.

16. The process according to claim 14, wherein the foil piece layers (6,7) are precompressed in a first step by the action of temperature and pressure and provided in a second step with a foil layer and bonded to the latter with a further application of pressure and heat prior to said step of compressing.

17. The process according to claim 14, wherein said step of compressing is effected with calender rollers.

18. The process according to claim 14, wherein the foil pieces (6,7) have a three-dimensional, flake-like configuration prior to compression.

19. The floor covering of claim 6, wherein the underside is provided with a fabric.

20. The floor covering of claim 6, wherein the underside is provided with a fleece.

21. The floor covering of claim 6, wherein the underside is provided with sprinkled-on material.

22. A floor covering including thermoplastic synthetic material with a decorative, visible side and an underside, said floor covering being formed from several layers of foil pieces (6, 7) made of thermoplastic synthetic material compressed and bonded together at least in part by pressure and temperature, and wherein the underside is provided with sprinkled-on material.

* * * * *